(12) United States Patent
Liu et al.

(10) Patent No.: US 6,414,584 B1
(45) Date of Patent: Jul. 2, 2002

(54) CARBON FIBER WIPER

(75) Inventors: Shengli Liu; John Zdanys; Norman C. Weingart, all of Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/405,548

(22) Filed: Sep. 24, 1999

Related U.S. Application Data

(63) Continuation-in-part of application No. 09/137,261, filed on Aug. 20, 1998, now Pat. No. 6,140,907.

(51) Int. Cl.⁷ .................. H01H 63/04; H01H 63/33; H01H 65/00; H01C 17/00; G01R 3/00
(52) U.S. Cl. .................. 338/202; 324/699; 29/595; 29/622
(58) Field of Search .................. 338/202; 324/699; 29/622, 595, 610.1

(56) References Cited

U.S. PATENT DOCUMENTS

| | | | |
|---|---|---|---|
| 411,947 A | * 10/1889 | Wightman | 338/202 X |
| 2,694,127 A | * 11/1954 | Fearn | 338/202 X |
| 2,806,928 A | * 9/1957 | Woods et al. | 338/202 X |
| 2,857,497 A | * 10/1958 | Bourns et al. | 338/202 X |
| 3,350,672 A | * 10/1967 | Hoffman | 338/202 X |
| 3,362,004 A | * 1/1968 | Beng | 338/202 X |
| 3,550,059 A | * 12/1970 | Borden et al. | 338/202 X |
| 3,886,386 A | 5/1975 | Hillig | 310/251 |
| 3,974,471 A | * 8/1976 | Gilliland | 338/202 |
| 4,158,831 A | * 6/1979 | Ragan | 338/202 X |
| 4,189,702 A | 2/1980 | Maloy | 367/109 |
| 4,336,565 A | 6/1982 | Murray et al. | 361/225 |
| 4,345,235 A | 8/1982 | Riley | 338/202 X |
| 4,358,699 A | 11/1982 | Wilsdorf | 310/251 |
| 4,553,191 A | 11/1985 | Franks | 361/212 |
| 4,568,876 A | 2/1986 | Maisch | 338/202 X |
| 4,761,709 A | 8/1988 | Ewing | 361/225 |
| 5,111,178 A | * 5/1992 | Bosze | 338/160 |
| 5,139,862 A | 8/1992 | Swift et al. | 428/294 |
| 5,177,529 A | 1/1993 | Schroll et al. | 355/200 |
| 5,668,479 A | * 9/1997 | Jackson et al. | 324/695 |
| 5,725,707 A | 3/1998 | Koon | 156/157 |
| 5,843,567 A | 12/1998 | Swift et al. | 428/221 |
| 6,140,907 A | * 10/2000 | Liu et al. | 338/202 X |
| 6,313,730 B1 | * 11/2001 | Ohara et al. | 338/202 X |

FOREIGN PATENT DOCUMENTS

| | | | |
|---|---|---|---|
| DE | 134748 | * 10/1902 | |
| DE | 136 425 | * 11/1902 | 338/202 |
| JP | 1-157502 | * 6/1989 | 338/202 |

* cited by examiner

*Primary Examiner*—Thomas P. Noland
(74) *Attorney, Agent, or Firm*—Mark P. Bourgeois; Mark W. Borgman

(57) ABSTRACT

An electrical brush wiper for use in a position sensor to contact an electrically resistive surface. The wiper has a metallic beam having a channel. The channel is formed from a pair of parallel extending flanges. One of the flanges is attached to the beam. Carbon fibers are secured within the channel between the flanges. The flanges have several tabs for securing the fibers in the channel. The tabs can be welded to the flanges.

9 Claims, 4 Drawing Sheets

CARBON FIBER WIPER

CROSS REFERENCE TO RELATED AND CO-PENDING APPLICATIONS

This application is a continuation in part of U.S. patent application Ser. No. 09/137,261, filed Aug. 20, 1998, and now U.S. Pat. No. 6,140,907 titled "Carbon Fiber Contacting Position Sensor". This application is related to U.S. patent application Ser. No. 09/151,022, filed Sep. 9, 1998, and now abandoned titled "Carbon Fiber Beam and Bristle Tip Contacting Position Sensor". These applications have the same assignee and are herein incorporated by reference in their entirety.

BACKGROUND OF THE INVENTION

1. Field of the Invention

This invention relates to position sensors. In particular, there is a carbon fiber wiper for use in a position sensor. The wiper has a long life.

2. Description of the Related Art

Various devices and methods of dealing with the design of position sensors are legion. More specifically, contacting position sensors have been formed from a contactor tip and a resistive element. The tip moves over the surface of the element and causes an output reading to change. Polymer resistive position sensors are a variable resistor type of electrical devices with a voltage output that converts the linear or angular displacement to an electrical signal. The contactors are conductive moving elements in the sensors that control the voltage output by sliding over a polymer resistive element. These contactors represent a unique type of sliding electrical contacts. They are miniature in design and size. The contactor is typically an alloy of platinum, silver, palladium and gold. The current density is low at approximately 10 A/sqin. or less. They run at slow sliding speeds, around 50 fpm or slower. The contactor should be capable of making good electrical contact under all the application environments, basically, heat and cold, dry and humid, dust, vibration, and etc as other types of contacts do. However, the reliability and noise performance requirements are more crucial than with other types of sliding contacts. The contactor must also have good corrosion resistance.

Currently, the contactors of this type are constructed with metallic materials or alloys, because they are good conductors, easy to process and readily available. Noble alloys such as gold, palladium and platinum alloys are often used because of their non-tarnishing character in all the common air pollutants. These noble alloy contactors have been used for decades, and have been well accepted in the industry. Because of their industry-wide importance the American Society for Testing and Materials has adopted numerous standards for these alloys, as shown in ASTM Standards Vol. 03.04.

As the contactor tip moves against the element surface wear occurs on both surfaces. The prior art contactor tips are formed from a metal having good wear resistance and spring characteristics, for example beryllium copper. The prior art resistive elements have been formed from carbon black and polymer combinations that are screened onto a substrate and dried and cured.

Examples of patents related to the present invention are as follows, and each patent is herein incorporated by reference for the supporting teachings:

U.S. Pat. No. 4,336,565 is a charge process with a carbon fiber brush electrode.

U.S. Pat. No. 4,568,876 is a method of testing a wiper of an electric potentiometer.

U.S. Pat. No. 5,139,862 is a pultruded electronic device.

U.S. Pat. No. 5,177,529 is a machine with removable unit having two element electrical connection.

U.S. Pat. No. 5,843,567 is an electrical component containing magnetic to particles.

U.S. Pat. No. 3,886,386 is a carbon fiber current collection brush.

U.S. Pat. No. 4,189,702 is a commutator and fiber brush rotating disc.

U.S. Pat. No. 4,345,235 is a variable resistance device.

U.S. Pat. No. 5,725,707 is an enhanced conductive joint.

U.S. Pat. No. 4,358,699 is a versatile electrical fiber brush.

U.S. Pat. No. 4,761,709 is a contact brush charging.

U.S. Pat. No. 4,553,191 is a static eliminator.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, the applicant's claimed invention.

3. Problem with the Related Art

There are several common problems occurring with the prior art. As the metal contactor tip moves against the element over time, it can gouge and pit the element causing the resistance reading to fail or to generate an erroneous resistance reading. Another problem with the prior art devices is that over time the element material can be removed from the element and build up as a loose layer over the surface of the element. When the contactor tip is moved it skates across the surface of the loose material instead of making electrical contact with the element. This causes the resistance reading from the element to appear as an open circuit with infinite resistance and essentially causes the sensor to be inoperative for a period of time until contact is reestablished by the contactor tip to the element.

Poor electrical contacts have often been found associated with the metal contactors, even with noble alloy contactors. As a result, electrical noise is generated from these contactors, which lowers the performance and reliability, and ultimately causes failure of the sensor devices. Excessive wear either from the contactor itself or from the polymer resistive elements has also often been found in this type of sensors, which reduces the durability and even causes premature failure of the sensor devices.

Prior art contacting position sensor designers have attempted to solve these problems by introducing a lubricant into the contactor tip/element interface. A typical lubricant is an emulsification of Teflon particles. The lubricant reduces the frictional forces between the wear surface while still allowing electrical contact to be made between the contactor tip and the resistive element. The liquid lubricant is applied to the contact surfaces to reduce the wear. However, most of the liquid lubricants are poor electrical conductors, thereby causing relatively high electrical resistance across contact surfaces and possible failure of the devices where lubricants have been used improperly. The viscosity of the liquid lubricant changes significantly over the application temperature range, resulting in poor contact at low temperatures and insufficient lubrication at high temperatures. There are several other problems that arise from using a lubricant in the contactor system. First, the amount of lubricant applied is critical to the performance of the system. If too little lubricant is applied, the system will have excessive wear. If too much is applied, erroneous resistance readings due to skating will occur. It is very difficult to repeatably apply a uniform layer of the lubricant. Second, using a lubricant adds additional cost in material and labor to the overall sensor cost.

There are several common problems occurring with the previous arrangements of electrical fibers. The previous arrangements of electrical fibers have been primarily concerned with the removal or application of a static charge. These arrangements do not have the requirements of precise alignment and motion control that is required in a position sensor. Also, the previous arrangements allow the fibers to flex excessively. This would cause a large error in output readings if they were used in a position sensor. The previous arrangements have also been difficult to repeatably manufacture.

Therefore, there is a need for a less expensive and easily manufacturable electrical wiper for use in position sensors.

SUMMARY OF THE INVENTION

It is a feature of the invention to provide an electrical wiper for use in a position sensor to contact an electrically resistive surface. In particular, the wiper includes a metallic beam having a channel and a first and second substantially parallel extending flanges forming the channel. The first flange is attached to the beam. A connecting flange is connected to the first and second flanges. Several carbon fibers having a proxil end are fixedly secured within the channel between the first and second flanges and a distal end extends outwardly from the channel. The flanges have several tabs for securing the fibers in the channel. The tabs can be welded to the flanges.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

Figure 1:
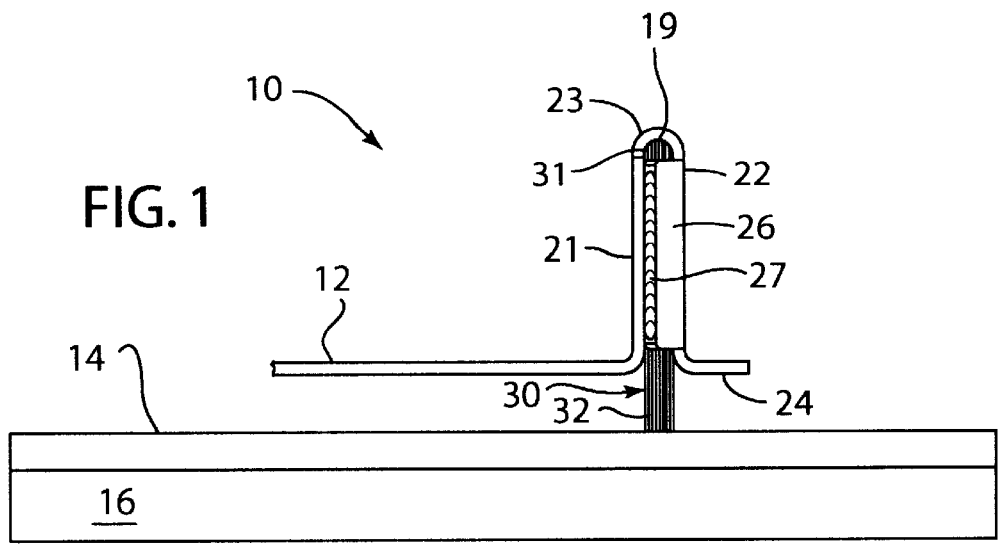
FIG. 1 is a side view of the preferred embodiment of a carbon fiber wiper in conjunction with a resistive substrate.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT

Figure 2:
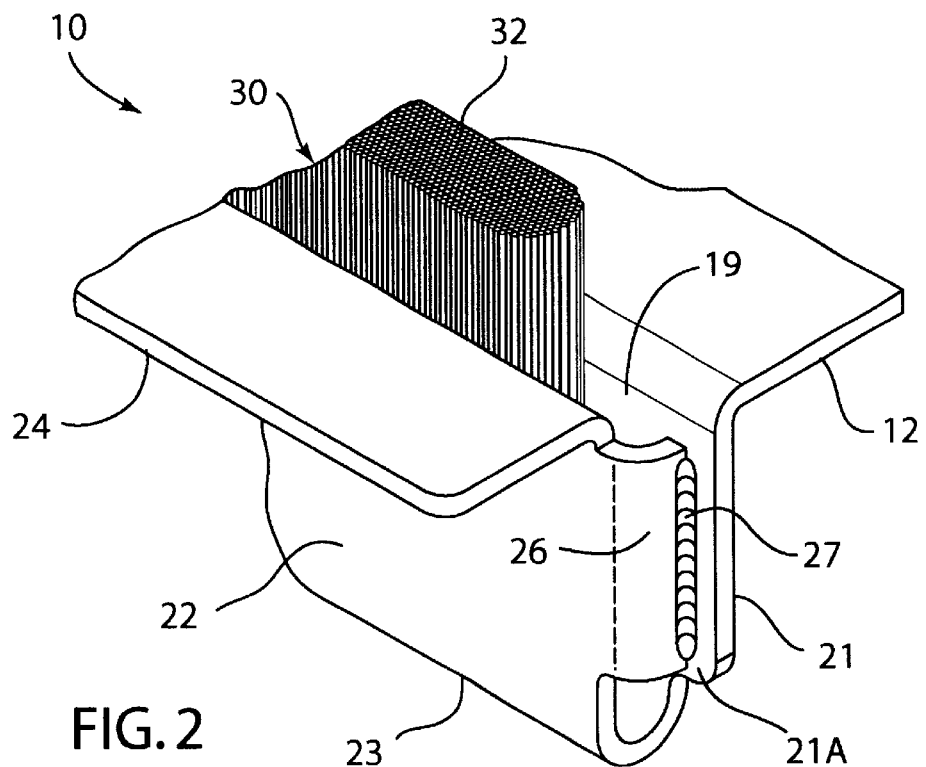
FIG. 2 is a perspective view of the carbon fiber wiper of FIG. 1.

Referring to FIGS. 1 and 2, a carbon fiber wiper assembly 10 is shown. An elongated metal beam 12 is used in a position sensor. Beam 12 has a channel 19 formed at one end. A pair of flanges 21 and 22 is attached by a connecting flange 23 to form a channel 19. Flange 21 is attached to beam 12. A lip 24 is attached to flange 22 and extends away from flange 22. Lip 24 makes flange 22 more rigid and prevents excessive flexing that could lead to loosening of the fibers. Several Carbon fibers 30 are held together at a proxil end 31 in channel 19 by holding and welding. A tab 26 attached to flange 22 is bent over and contacts flange 21 on an inside edge 21A where it is held with a laser weld 27. The metal beam is preferably formed from a non-ferrous spring metal such as brass or beryllium copper. The beam and channel can be formed by stamping or by chemical etching. The carbon fibers are 10 micron diameter carbon fibers, fiber type P55, commercially available from Amoco Corporation, Chicago, Ill. The distal end 32 of the carbon fibers 30 is in electrical contact with a resistive element 14. Resistive element 14 rests on and is supported by a flexible film or substrate 16.

During operation, the carbon fibers 30 move over the resistive element 14 causing a voltage reading to change and an electrical signal to pass through the beam 12, carbon fibers 30 and resistive element 14. In a typical position sensor application, a pair of electrically connected wiper assemblies 10 are used along with a pair of resistive elements 14 that are electrically connected. The path of the electrical circuit is as follows, a position dependent voltage from resistive element 14 is communicated through carbon fiber end 32, carbon fibers 30, beam 12, other beam 12, other carbon fibers 30, other carbon fiber end 32 and through other resistive element 14 which is connected to the output of the sensor. The carbon fiber wiper assembly 10 is assembled by placing a length of fibers 30 into channel 19. A fixture (not shown) applies pressure to flanges 21 and 22 to hold the fibers in place while weld 27 is applied by a conventional laser welder. The fibers are then cut to form distal end 32.

Figure 3:
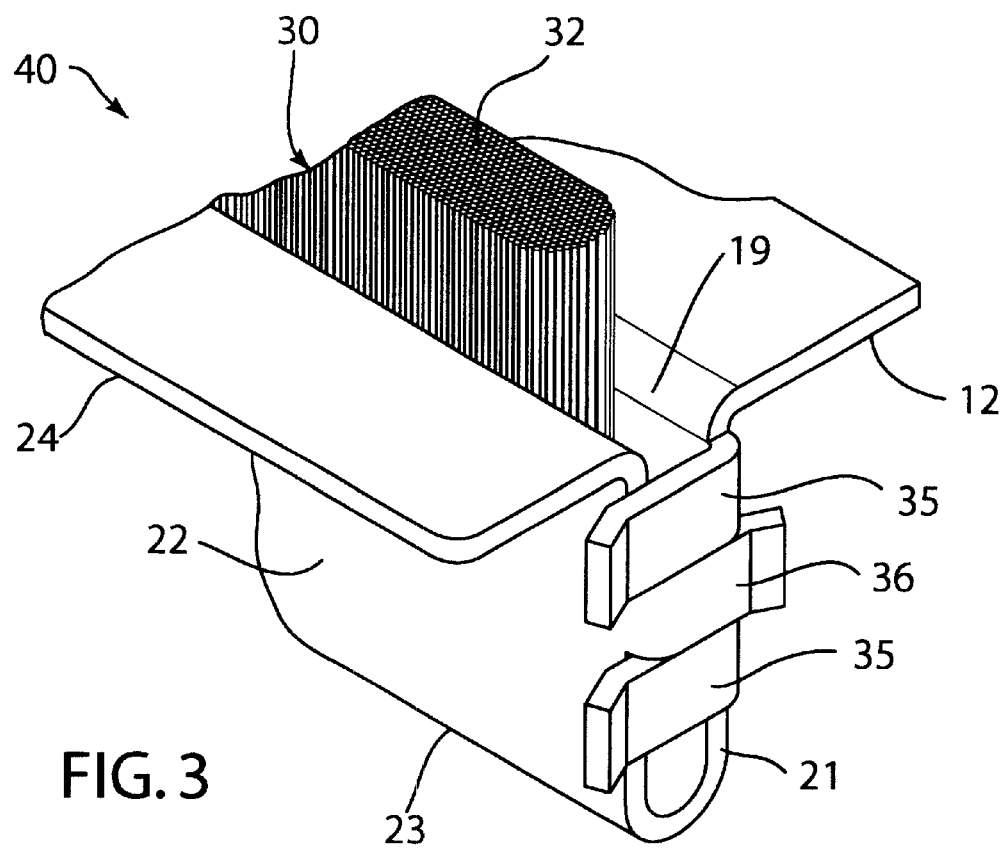
FIG. 3 is a perspective view of an alternative embodiment of a carbon fiber wiper.
Figure 4:
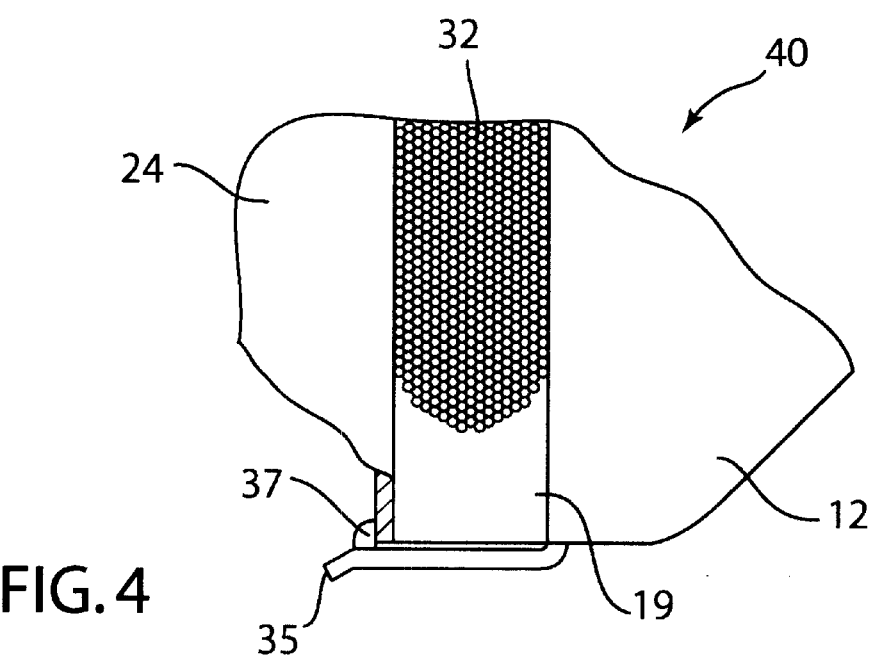
FIG. 4 is a top view of FIG. 3 showing welded tabs.

Referring to FIGS. 3 and 4, an alternative embodiment of a carbon fiber wiper assembly 40 is shown. An elongated metal beam 12 is used in a position sensor. Beam 12 has a channel 19 formed at one end. A pair of flanges 21 and 22 are attached by a connecting flange 23 to form channel 19. Flange 21 is attached to beam 12. A lip 24 is attached to flange 22 and extends away from flange 22. Several Carbon fibers 30 are held together at a proxil end 31 in channel 19 (not shown) by holding and welding. Tabs 35 are attached to flange 21 and are bent over and abut flange 22 where it is held with a laser weld 37. Similarly, tab 36 is attached to flange 22 and is bent over and abuts flange 21 where it is held with a laser weld 37. The metal beam is preferably formed from a non-ferrous spring metal such as brass or beryllium copper. The beam and channel can be formed by stamping or by chemical etching. The carbon fibers are 10 micron diameter carbon fibers, fiber type P55, commercially available from Amoco Corporation, Chicago, Ill. The distal end 32 of the carbon fibers 30 would contact element resistive element 14. The operation of the wiper 40 of FIG. 3 is the same as in wiper 10 of FIG. 1. Again, the carbon fiber wiper assembly 40 is assembled by placing a length of fibers 30 into channel 19. A fixture (not shown) applies pressure to flanges 21 and 22 to hold the fibers in place. Tabs 35 and 36 are bent and weld 37 is applied. The fibers are then cut to form distal end 32.

Figure 5:
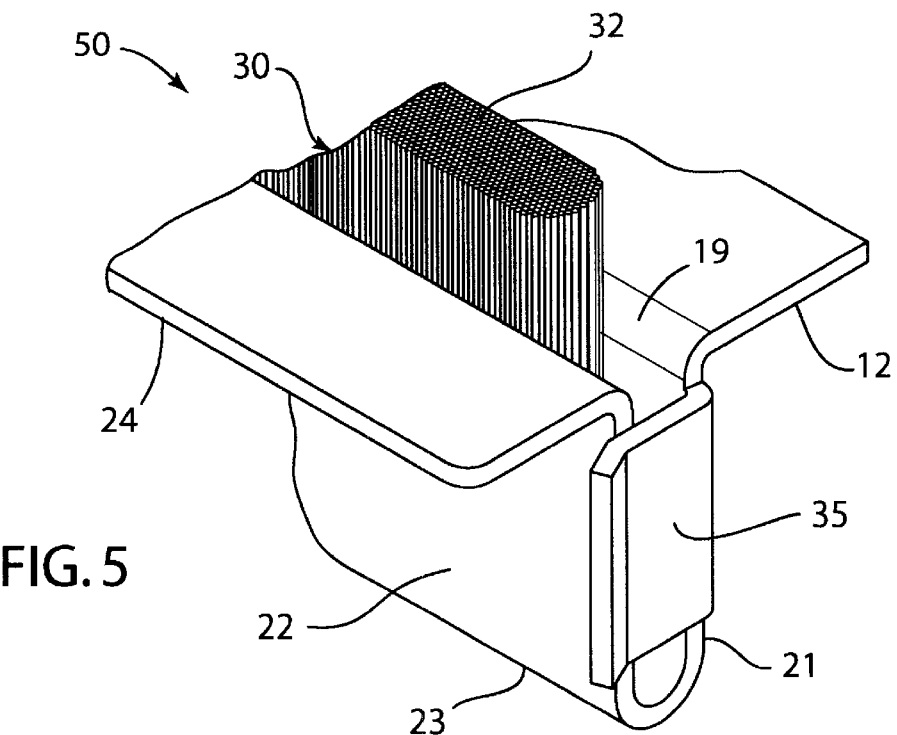
FIG. 5 is a perspective view of another embodiment of a carbon fiber wiper.

Referring to FIG. 5, another embodiment of a carbon fiber wiper assembly 50 is shown. Wiper 50 is similar to wiper 40 except that tab 36 has been eliminated and one of tabs 35 has been enlarged to cover the sides of flanges 21 and 22.

Figure 6:
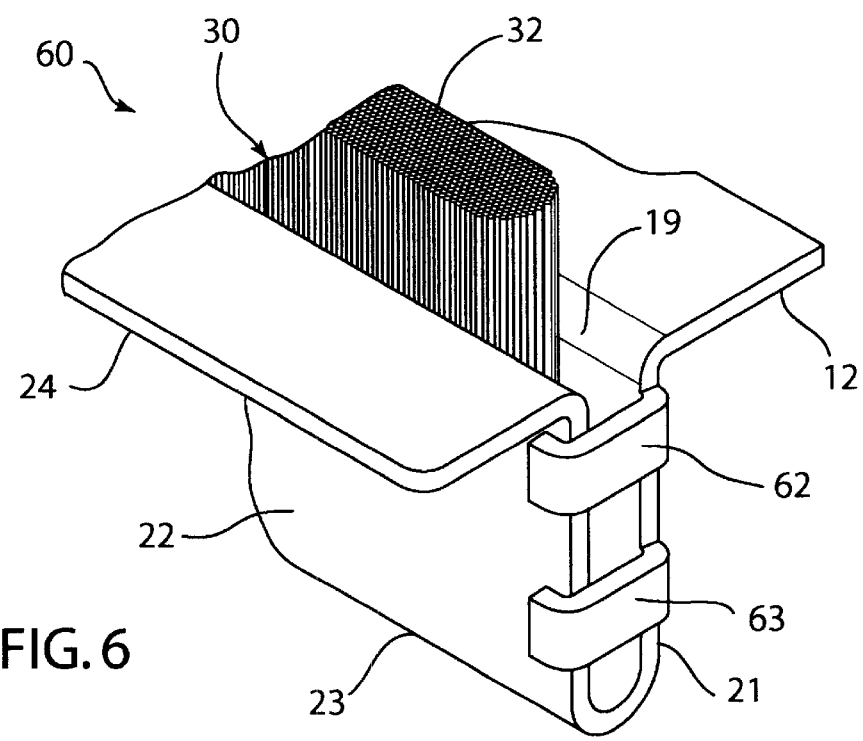
FIG. 6 is a perspective view of another embodiment of a carbon fiber wiper.

Referring to FIG. 6, another embodiment of a carbon fiber wiper assembly 60 is shown. Wiper 60 is similar to wiper 40 except that tabs 35 and 36 have been eliminated and bent over clips 62 and 63 added. Clips 62 and 63 extend from flange 21 and are bent over flange 22 to retain carbon fibers 30. No welds are used in this version.

Figure 7:
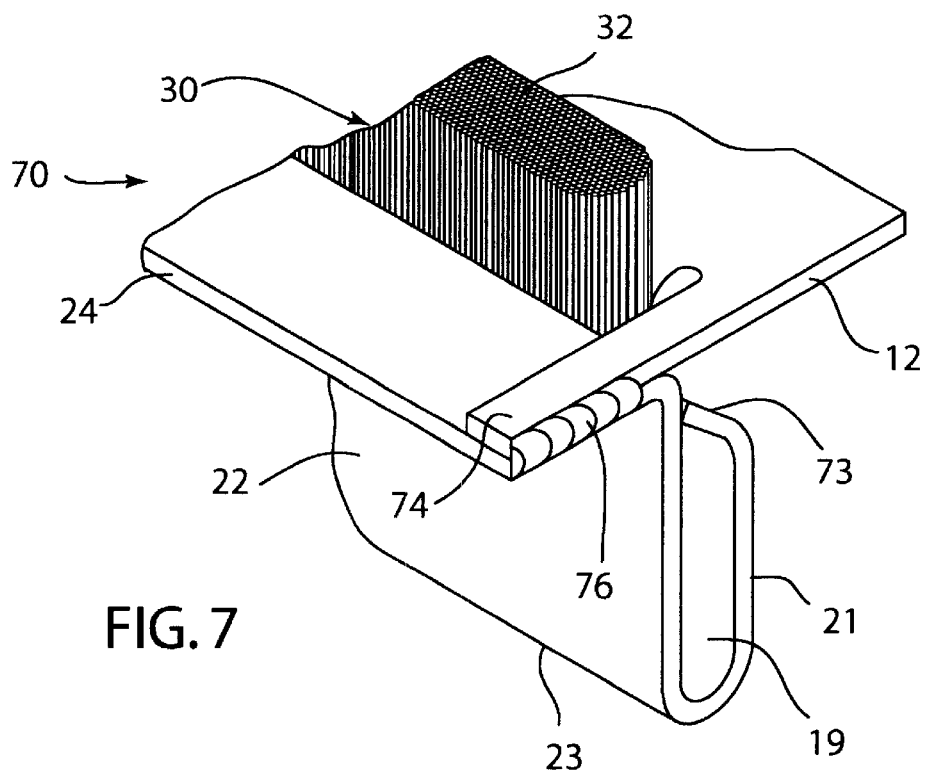
FIG. 7 is a perspective view of another embodiment of a carbon fiber wiper.

Referring to FIG. 7, another embodiment of a carbon fiber wiper assembly 70 is shown. Wiper 70 is similar to the previous versions except that an ear 74 has been added that extends from beam 12 over channel 19 and abuts over the top of lip 24. Flange 21 has a rolled portion 73 added on each end of flange 21. Several Carbon fibers 30 are held together in channel 19. Ear 74 is held to lip 24 by a weld 76. Weld 76 preferably is a laser weld. Carbon fiber wiper assembly 70 is assembled by placing a length of fibers 30 into channel 19. A fixture (not shown) applies pressure to flanges 21 and 22 to hold the fibers in place. Ear 74 is then welded to lip 24 by weld 76. The fibers are then cut to form distal end 32.

Figure 8:
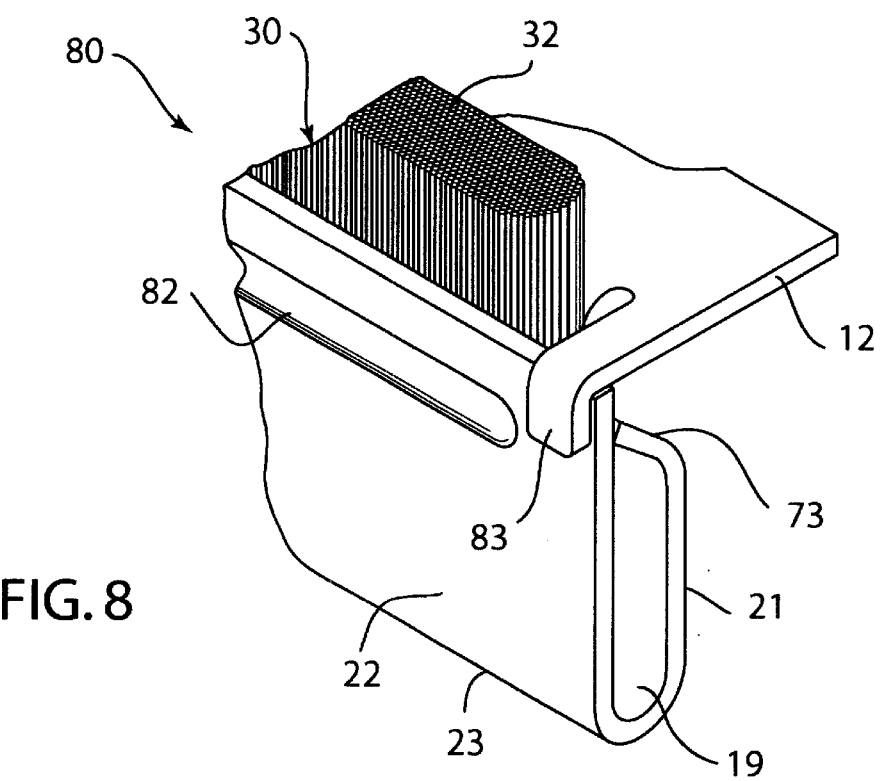
FIG. 8 is a perspective view of another embodiment of a carbon fiber wiper.

Referring to FIG. 8, another embodiment of a carbon fiber wiper assembly 80 is shown. Wiper 80 is similar to wiper 70, except that lip 24 has been eliminated and a boss stiffener 82 added. Boss 82 makes flange 22 more rigid and prevents excessive flexing that could lead to loosening of the fibers. An ear 83 extends from beam 12 over channel 19 and is bent down over flange 22 and clinched. Flange 21 has a rolled portion 73 added on each end of flange 21. Clinching of ears 83 holds carbon fibers 30 in channel 19. No welds are used. Carbon fiber wiper assembly 80 is assembled by placing a length of fibers 30 into channel 19. A fixture (not shown) applies pressure to flanges 21 and 22 to hold the fibers in place. Ear 83 is then bent down and clinched to flange 22. The fibers are then cut to form distal end 32.

Remarks About the Preferred Embodiment

One of ordinary skill in the art of designing and using position sensors and electrical contactors will realize many advantages from studying and using the preferred embodiment. For example, the wiper 10, has high electrical conductivity, high mechanical strength and high wear resistance, chemical inertness, stability at elevated temperatures and good corrosion resistance.

One advantage that the carbon fiber wipers of the present invention has is that they are able to hold the dimensions of the channel the same at the ends of the channel and in the middle. Other embodiments have had a problems with the fibers near the outer edges of the channels being excessively crimped, causing them to spread and twist and attempt to squirt out of the channel. The tabs, ears and rolled portions all serve to help hold the ends of flanges 21 and 22 slightly apart and maintain the same dimensional width of the channel 19 across the entire length of the flanges, while at the same time allowing fibers 30 to be securely held within channel 19.

Various parameters must be taken into account when designing a contacting sensor such as the fiber length, contact angle to the resistive element, fiber thickness and width. The design parameters for the contactor beam include the contactor load force, stiffness, and flexibility. The fiber, after attachment, can be trimmed with a laser or other mechanical means. The fiber can also be polished with fine abrasive surface to improve the contact.

The carbon fiber wiper of the present invention has other advantages such as prolonged service life and contact resistance that throughout the life of the sensor remains consistent. It does not require any kind of lubricant; therefore it can operate under wider temperature ranges and can also be operated at a higher sliding speed, because there is no skating or hydroplaning, a phenomenon associated with a liquid lubricant. In addition, the carbon fiber wiper has demonstrated the capability of dealing with wear debris and film build-up, the common source of noise in a sliding contact due to the cleaning effect from the brush type of fiber tip. Using a carbon fiber wiper results in significantly lower wear of the resistive element 14 and more consistent contact resistance are achievable. The sweeping action of each individual fiber bristle also makes the build up of wear debris very difficult.

Variations of the Preferred Embodiment

Although the illustrated embodiments discuss the arrangement of holding the carbon fibers 30 to a metal beam 12, it is contemplated to use other types of beams such as plastic and then use a wire to connect with the carbon fibers. Further, the beam itself could be formed from carbon fibers as an integral unit.

Although the preferred embodiment depicts a certain shaped beam 12, many variations are possible. For example, the beam 12 could extend vertically away from element 14, with the fibers 30 attached to the end of the beam 12.

The substrate 16 for the resistive element 14 was described as a flexible film. It is possible for substrate 16 to be a ceramic or a printed circuit board.

Although the preferred embodiment depicts a variety of tab configurations, many variations are possible. For example, more or fewer tabs could be used. The tabs could be wire like or C-shaped.

The invention has described the use of clinched and welded tabs However, It is contemplated to use other fastening methods for the tabs such as adhesives, mechanical fasteners including screws, rivets and bolts, ultrasonic welding, spot welding, and brazing.

The invention has described the use of carbon fibers. However, it is contemplated that other conductive fiber materials could also be used, for example silicon carbide or conductive polymer fibers or conductive ceramic fibers would be suitable. A skilled artisan will realize that any non-metallic conductive fiber material will also work.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed and desired to be secured by United States Patent is:

1. A wiper for making an electrical contact, comprising:
    a) an electrically conductive beam;
    b) an electrically conductive channel having a first and second substantially parallel extending flanges disposed substantially perpendicular to the beam, the first flange attached to the beam;
    c) a plurality of fibers having a proxil end fixedly secured within the channel and a distal end extending outwardly from the channel.

2. The wiper according to claim 1, wherein the fibers are selected from the group consisting of:

a) carbon;

b) silicon carbide; and c) a non-metallic conductor.

3. The wiper according to claim 2, wherein the second flange has a lip attached thereto.

4. The wiper according to claim 2, wherein the first flange further comprises:

a) at least one first tab outwardly extending from the second flange and abutting the first flange.

5. The wiper according to claim 4, wherein a weld is formed between the first tab and the first flange for holding the second flange securely against the first flange.

6. The wiper according to claim 4, wherein the second flange further comprises:

a) at least one second tab outwardly extending from the first flange over the second flange for holding the first flange securely against the second flange.

7. The wiper according to claim 6, wherein a weld is formed between the second tab and the second flange.

8. The wiper according to claim 3, wherein the beam has at least one ear that extends over the lip and is welded thereto.

9. The wiper according to claim 2, wherein the beam has at least one ear that is bent over the second flange.

\* \* \* \* \*